INVENTORS
CHARLES K. HOOPER
AND BERNARD V. GERBER
BY
ATTORNEYS

United States Patent Office 3,292,066
Patented Dec. 13, 1966

3,292,066
DYNAMIC BRAKING CIRCUIT FOR INDUCTION MOTORS
Charles K. Hooper, Linthicum Heights, and Bernard V. Gerber, Baltimore, Md., assignors, by mesne assignments, to the United States of America as represented by the Secretary of the Air Force
Filed Apr. 30, 1964, Ser. No. 364,048
1 Claim. (Cl. 318—211)

This invention relates generally to electric motors, and more particularly, to a dynamic braking circuit for a single phase induction motor.

Reversible single-phase induction motors of the capacitor type are often used to drive autotransformers and induction regulators. Relays are commonly utilized for remote control or automatic operation. Now it is essential in automatic operation that the motor stop abruptly, as desired, otherwise hunting will result. In typical applications the induction motor has sufficient inertia, causing it to coast after removal of power and an auxiliary braking means is needed. A squirrel cage induction motor may be rapidly braked by passing a unidirectional current through its field, thereby resulting in a dynamic retarding torque.

Therefore, it is an object of this invention to dynamically brake induction motors.

It is an object of this invention to provide a circuit for reversing and dynamic braking of a single-phase induction motor of the capacitor type.

It is still another object of the invention to provide a reversing and dynamic braking circuit for an induction motor which is simple, economical to produce and which utilizes a minimum of conventional, currently available components that lend themselves to standard mass production manufacturing techniques.

Figure 1:
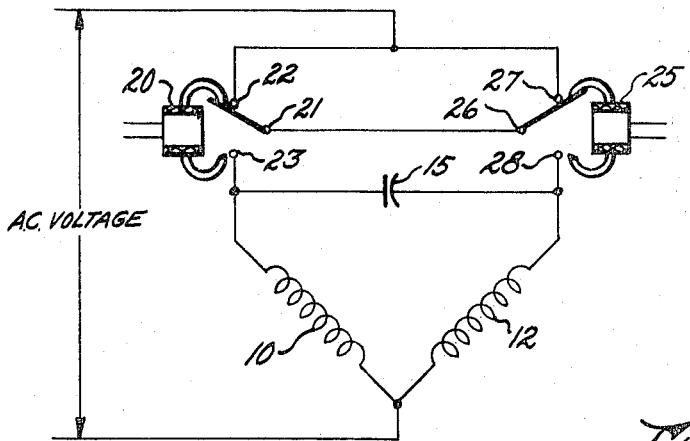
Figure 2:
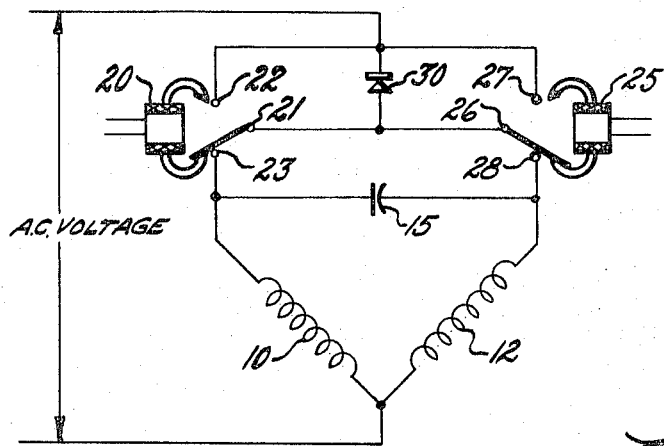

Other objects and a fuller understanding of the invention may be had by referring to the following description and claim, taken in conjunction with the accompanying drawings, in which:

FIGURE 1 is a circuit diagram representing the stator field windings and reversing circuits of a capacitor motor; and FIGURE 2 is a circuit diagram of the invented reversing and dynamic braking circuit incorporated in a capacitor motor field.

With reference to the figures, wherein like numerals refer to like parts, a conventional capacitor motor field includes field windings 10, 12 and capacitor 15, connected across an A.C. voltage source. A reversing circuit may be provided by a switching arrangement alternatively providing a source of current first at one side, then at the opposite side of capacitor 15 for forward and reverse operation, respectively, of the motor.

A reversing circuit is provided herein by a pair of relay switches 20, 25, which are interconnected at their central terminals 21, 26, as illustrated in the figures. Each switch 20, 25 has, respectively, a separate current source terminal 22, 27, and a separate field terminal 23, 28. The field terminals 23, 28 are connected at opposite sides of the capacitor 15 as diagrammed.

In FIGURE 2, a conventional semiconductor rectifier 30 is shown connected between the central terminals 21, 26 and current source terminals 22, 27. Rectifier 30 may be any available rectifier capable of providing a pulsating unidirectional current.

It is understood, of course, that each relay switch 20, 25 may be energized independently of the other, to a position, respectively, either at the source terminal 22, 27, or at the field terminal 23, 28. In FIGURE 1, with both relays 20, 25, at their respective source terminals 22, 27, the motor is disconnected from the line. Positioning of either switch 20, 25 at its respective source terminals 22, 27, and the other switch 20, 25 at its respective field terminal 23, 28 will connect the motor to the line for normal operation. Alternatively, interchanging the positions of switches 20, 25 will apply current at the opposite side of capacitor 15 to change the direction of the motor. During normal motor operation, in either direction, the rectifier 30, has no effect as it is shorted out at a source terminal 22, 27 and through a field terminal 23, 28. To apply a dynamic brake the respective switch 20, 25 at its respective source terminal 22, 27 is energized to remove it therefrom. Thus, the short circuit of rectifier 30 is removed to connect the rectifier in series with the motor field and a unidirectional current is provided through the coils 10, 12. The braking action is quite rapid, for example, as soon as the short circuit, at, say source terminal 22, of switch 20, is removed from rectifier 30, a pulsating D.-C. current immediately flows in winding 12 through field terminal 28 and central terminal 26 of switch 25. Immediately thereafter, switch 20 continues to a reposition at field terminal 23, for a current flow in winding 10 through field terminal 23 and central terminal 21 to the rectifier 30. FIGURE 2 diagrams the resulting position with a unidirectional pulsating flow through both windings 10, 12 and rectifier 30. Repositioning of either switch 20, 25 will reestablish normal operation in direction according to the respective switch positions. Laboratory tests were very significant as a small 400 cycle motor with a normal stopping time of 5 seconds was found to stop in 1 second when the invented circuit was employed.

Although the invention has been described with reference to a particular embodiment, it will be understood to those skilled in the art that the invention is capable of a variety of alternative embodiments within the spirit and scope of the appended claim.

We claim:
In a single phase alternating current induction motor of a type identified by a field including a capacitor therein, a circuit for reversing and dynamic braking thereof, comprising: a pair of relay switches with interconnected central terminals, each having a separate current source terminal and a separate field terminal at an opposite side of said capacitor, said switches, one at said source terminal and other at said field terminal, alternatively, for forward and reverse operation, respectively, of said motor; and a semiconductor rectifier connected between said central and source terminals and in series with said field with both said switches at said field terminals, said rectifier allowing a pulsating unidirectional current through said field to dynamically brake said motor.

References Cited by the Examiner
UNITED STATES PATENTS

| | | | |
|---|---|---|---|
| 2,154,314 | 4/1939 | Minneci | 318—212 X |
| 2,213,892 | 9/1940 | West | 318—211 X |
| 2,637,007 | 4/1953 | Picking et al. | 318—212 |

ORIS L. RADER, *Primary Examiner.*

G. Z. RUBINSON, *Assistant Examiner.*